United States Patent [19]
Foster

[11] 3,751,021
[45] Aug. 7, 1973

[54] LEAF SPRING CLAMP AND SUPPORT
[75] Inventor: Alan D. Foster, Adrian, Mich.
[73] Assignee: The Dayton Steel Foundry Company, Dayton, Ohio
[22] Filed: Oct. 12, 1971
[21] Appl. No.: 188,153

[52] U.S. Cl. .............................................. 267/52
[51] Int. Cl. ............................................ F16f 1/26
[58] Field of Search ...................................... 267/52

[56] References Cited
UNITED STATES PATENTS
3,058,740  10/1962  Harbers et al. ..................... 267/52
3,602,523  8/1971  Poulos ................................ 267/52

Primary Examiner—James B. Marbert
Attorney—Lawrence B. Biebel, Gilbert N. Henderson et al.

[57] ABSTRACT

A leaf spring for use with a mobile home or the like is clamped between an axle pad and a top pad of generally U-shaped cross-sectional configuration. The sides of the top pad overlap the axle pad, and the parts are welded together while retained under a substantial preload force to form a permanent spring support. The axle pad is then suitably mounted on the axle.

7 Claims, 5 Drawing Figures

PATENTED AUG 7 1973 3,751,021
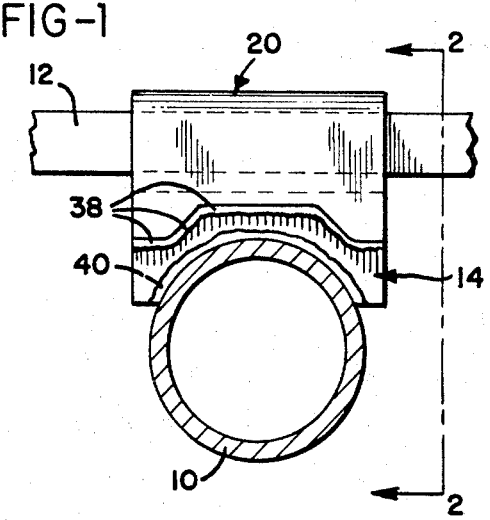
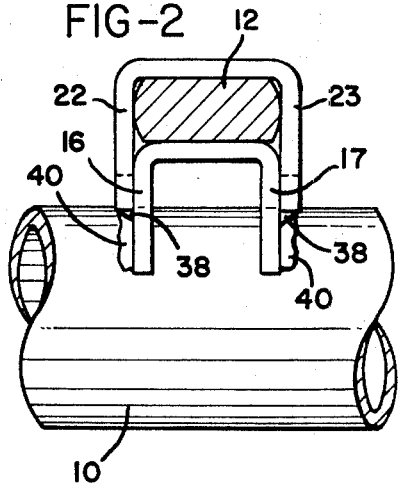
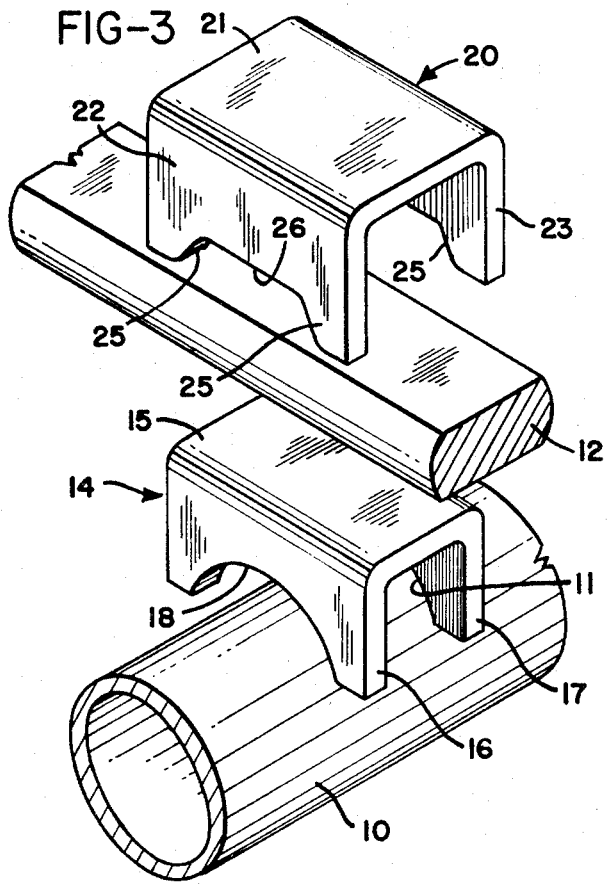
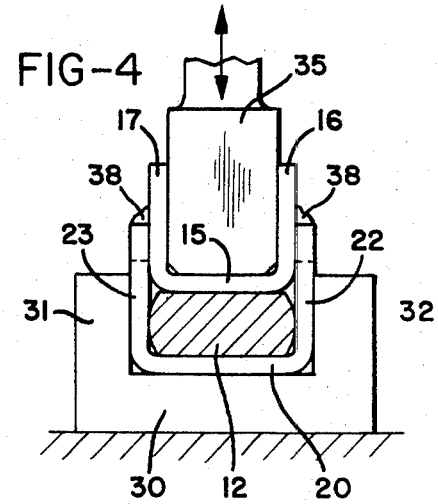
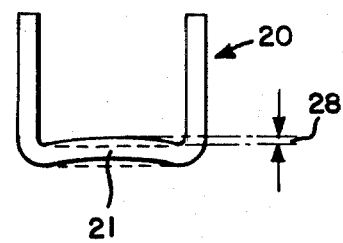
INVENTOR
ALLEN D. FOSTER
BY
Marechal, Biebel, French & Bugg
ATTORNEYS 3,751,021

LEAF SPRING CLAMP AND SUPPORT

BACKGROUND OF THE INVENTION

Leaf springs used for the transportation of mobile homes and the like are commonly supported on an axle pad by means of conventional U-bolts. Such U-bolt structure is shown, for example, in U.S. Pat. No. 2,157,499. While such arrangement has been successful, it is a relatively expensive and time-consuming operation. Further, the repairable feature of a U-bolt support is a relatively unimportant matter in axle assemblies used for mobile homes.

SUMMARY OF THE INVENTION

The present invention is directed to a permanent mounting arrangement for leaf springs, and the method of making the same, in which the spring is mounted on an axle pad or a lower pad, and a top or upper pad is fitted over the spring. The upper pad is contiguous with the lower pad at a region which is spaced from the spring. The pads are then preloaded as by hydraulic force to frictionally grip the spring therebetween, and while the load is applied, the pads are permanently joined, such as by welding. The spring is accordingly frictionally gripped in a fabricated pad assembly, and may now be mounted on an axle and suitably attached, as by welding at the axle pad.

The arrangement is one in which the spring can be attached to an axle at minimum expense. The permanent attachment of the kind described is satisfactory for use in mobile homes where, in general, the vehicle is not intended for continuous road use but is intended primarily for transportation to a permanent home site. While such distances frequently do not exceed the 300 miles, nevertheless, the arrangement must be one which will provide satisfactory results with transportation distances of 2,000 miles or more.

It is, accordingly, an important object to provide an improved spring clamp arrangement for a leaf spring suitable for use on mobile home running gear and the like.

Another object of the invention is the provision of an assembly, and the method of making the same, in which a leaf spring is supported on an axle pad by compressive force between upper and lower pad members which are permanently joined together.

A still further object of the invention is the provision of an axle and spring assembly in which a leaf spring is supported on an axle pad by a top pad of generally U-shaped cross-sectional configuration, in which the side walls of the top pad are in overlapping relation with the bottom pad and in which the pads are welded together along the terminal edge of the side walls of the top pad.

These and other objects and advantages of the invention will be apparent from the following description, the accompanying drawings and the appended claims.

BRIEF DESCRIPTION OF THE DRAWINGS

FIG. 1 is a side view, partially in section, of the spring assembly according to the present invention;

FIG. 2 is a view looking generally along the line 2—2 of FIG. 1;

FIG. 3 is an isometric view showing the relation of the parts of the invention;

FIG. 4 is a diagram showing one step in the method of assembly; and

FIG. 5 is an end view of the top pad prior to assembly.

DESCRIPTION OF THE PREFERRED EMBODIMENT

Referring to the drawings, a conventional axle 10, forming part of the running gear for a mobile home or the like, is shown in section in FIG. 1 and a fragmentary longitudinal portion of the axle 10 is shown in FIG. 2. The assembly further includes a conventional leaf spring 12 which is to be supported on the axle 10.

A lower axle support pad is illustrated generally at 14. This pad is preferably formed of ¼ inch sheet steel and is generally U-shaped in cross-sectional configuration presenting a generally flat spring supporting top or upper surface 15 and a pair of depending spaced-apart legs 16 and 17. Each leg is provided with a semi-circular cutout portion 18 adapted to conform to the surface of the axle 10.

Means for retaining the spring 10 on the axle pad 14 comprises an upper pad illustrated generally at 20. The upper pad 20 may be formed of the same material as that of the axle pad 14 and is also generally U-shaped in cross-sectional configuration to include an upper spring engaging portion 21 and a pair of spaced-apart depending side walls 22 and 23. The upper pad 20 preferably has a length in the longitudinal direction of the spring 12 substantially the same as that of the axle pad 14, and the spaced-apart width of the side walls 22 and 23 corresponds generally to the outside dimension of the axle pad 14 at the legs 16 and 17. Further, the length of the side walls 22 and 23, in the direction of the axle 10, is such as to overlap the legs 16 and 17 and terminate at regions which are spaced well below the spring 12.

Preferably, the side walls 22 and 23 are each cut out to form an opposite pair of diagonal portions 25 separated by a straight section 26. Preferably, the upper portion 21 is formed with a slight radius or curvature defining an off-set 28, FIG. 5, which may be in the order of 10–150 thousandths of an inch.

The assembly of the parts is illustrated in FIG. 4 in which the upper pad 20, the spring 12 and the lower pad 14 are positioned, in inverted relation, within a fixture 30. The fixture 30 includes side walls 31 and 32 which conform to the outer dimensions of the pad walls 22 and 23 and provide support for these walls and prevent deflection thereof. A ram 35 is brought into position on the inside surface of the pad 14 and the assembly is subjected to a pre-loading force, which can be in the order of 6,000 lbs. for example.

This force is sufficient to substantially flatten the off-set or curvature 28. While this force is applied, the pads 14 and 20 are permanently joined to each other as by welding along the lower terminal edge of the upper pad 20, as illustrated by the welds 38. The diagonal portions 25 provide regions in which the welds are partially in tension, to achieve improved joining of these parts.

The resulting assembly is one in which the spring 12 is permanently clamped between the axle pad 14 and the upper pad 20, and is one in which the upper pad is in a permanently stressed condition to maintain the grip on the spring 12. Although welding is preferred, obviously other methods of uniting the parts, such as by bonding, bolting or riveting, may be used.

The spring 12 and the pad assembly may now be brought into position on the axle 10 and welded thereto along the junction of the cutout 18, as illustrated by the weld line 40 in FIGS. 1 and 2. It is, however, within the scope of this invention to use a lower axle pad which is welded exclusively along a neutral axis of the axle as taught in the patent of Marti, No. 3,378,250 of 1968, assigned to the same assignee as this invention.

The side walls 22 and 23 of the pad 20 are proportioned to extend down over the respective sides of the pad 14 so that the position of the weld line 38 is substantially spaced from the spring 12. In this manner, there is no detrimental affect to the spring 12 by the welding of the pads together under the preloaded conditions as described above. The result is a permanent assembly which can be made at relatively low cost, eliminating the need for the U-bolts and the attaching nuts and the necessity for assembling the same. Also, the pads 14 and 20 may be assembled onto leaf springs 12 and placed in stock, ready for use when needed.

While the method herein described, and the form of apparatus for carrying this method into effect constitute preferred embodiments of the invention, it is to be understood that the invention is not limited to this precise method and form of apparatus, and that changes may be made in either without departing from the scope of the invention.

What is claimed is:

1. An axle and spring assembly particularly adapted for use with mobile homes and the like, comprising an axle pad, means mounting said axle pad to a transverse axle, a leaf spring on said axle pad, a top pad including an upper spring-engaging surface and a pair of depending side walls, said side walls proportioned to extend in partially over-lapping relation to said axle pad at regions spaced from said spring, said top pad being joined to said axle pad by welding along said side walls.

2. The assembly of claim 1 in which said top pad has an upper portion defining a transversely curved said spring-engaging surface and which is joined to said axle pad in a flattened permanently stressed condition with said side walls in tension to maintain a gripping force on said spring between said surface and said axle pad.

3. The assembly of claim 1 in which said top and bottom pads each have generally U-shaped configurations in transverse section, and which are positioned in partially internested relation with said spring inbetween.

4. An axle and spring assembly particularly adapted for use with mobile homes and the like, comprising an axle pad, means mounting said axle pad to a transverse axle, a leaf spring on said axle pad, a top pad having a generally U-shaped cross-sectional configuration including an upper spring-engaging surface and a pair of depending side walls, said side walls proportioned to extend in partially over-lapping relation to corresponding portions of said axle pad at side regions spaced from said spring, and means permanently joining said top pad to said axle pad in compressive relation to said spring therebetween.

5. The assembly of claim 4 in which said top pad is formed with a transversely curved said spring-engaging surface and in which said side walls are welded to said axle in tension to maintain a gripping force on said spring.

6. The method of supporting and connecting a leaf spring on an axle, comprising the steps of:
   placing the spring on an axle pad adapted to be mounted on the axle,
   applying a top pad having side walls to said spring on the opposite side of said axle pad with said side walls contiguous with the axle pad,
   applying a compressive force between said top pad and said axle pad for frictionally gripping said spring therebetween,
   and while said force is applied, welding said top pad to said axle pad.

7. The method of supporting and connecting a leaf spring on an axle pad, comprising the steps of:
   inserting the spring between an axle pad and a top pad, in which the top pad is formed with side flanges which extend over the sides of the spring and which terminate in overlying relation to a side wall portion of the axle pad,
   applying a compressive force between the top pad and the axle pad while preventing outward deflection of the side walls of the top pad to maintain a contiguous relation to the axle pad,
   and while maintaining the compressive force, welding the top pad to the axle pad along the joints formed between the respective side flanges and side wall portions.

* * * * *